United States Patent [19]

Findley et al.

[11] 3,999,168
[45] Dec. 21, 1976

[54] INTERMIXED PITCHES IN A BUFFERED PRINTER

[75] Inventors: Gerald Ivan Findley, Morgan Hill; Kenneth Dean Cummings; Teddy Lee Anderson, both of San Jose, all of Calif.

[73] Assignee: International Business Machines Corporation, Armonk, N.Y.

[22] Filed: Nov. 11, 1974

[21] Appl. No.: 522,996

[52] U.S. Cl. .......... 340/172.5; 340/324 R; 178/30; 178/15; 197/20
[51] Int. Cl.² .......... G06F 3/12; G06F 7/32; G06F 13/00
[58] Field of Search .......... 340/172.5, 146.3 D, 340/146.3 AH, 146.3 MA, 173 LM, 324 A, 324 AD, 324 M, 324 R; 331/94.5 K, 94.5 M; 332/7.51; 346/76 L; 354/5, 7, 8, 9; 178/4, 6, 7, 15, 25, 30; 445/1; 101/93, 13; 197/16, 19, 20, 133 R

[56] References Cited
UNITED STATES PATENTS

| | | | |
|---|---|---|---|
| 3,332,071 | 7/1967 | Goldman et al. | 340/172.5 |
| 3,419,322 | 12/1968 | Adler | 350/161 |
| 3,506,779 | 4/1970 | Brown et al. | 178/15 |
| 3,586,120 | 6/1971 | Adler | 181/.5 |
| 3,622,701 | 11/1971 | Gardner | 178/30 |
| 3,624,607 | 11/1971 | Mita et al. | 340/146.3 AH |
| 3,634,828 | 1/1972 | Myers et al. | 340/172.5 |
| 3,688,033 | 8/1972 | Hell et al. | 178/15 |
| 3,701,999 | 10/1972 | Congleton et al. | 346/76 L |
| 3,740,743 | 6/1973 | Baron | 340/324 A |
| 3,750,189 | 7/1973 | Fleischer | 346/74 ES |
| 3,760,376 | 9/1973 | Tanner | 340/172.5 |
| 3,786,429 | 1/1974 | Goldman et al. | 340/324 A |
| 3,815,094 | 6/1974 | Smith | 340/172.5 |
| 3,815,104 | 6/1974 | Goldman | 340/172.5 |
| 3,848,232 | 11/1974 | Leibler et al. | 340/172.5 |
| 3,868,673 | 2/1975 | Mau, Jr. et al. | 340/324 AD |
| 3,886,526 | 5/1975 | Smith | 340/324 A |
| 3,893,075 | 7/1975 | Orban et al. | 340/172.5 |
| 3,895,374 | 7/1975 | Williams | 340/324 AD |
| 3,896,428 | 7/1975 | Williams | 178/30 X |
| 3,930,251 | 12/1975 | Salava et al. | 178/15 X |

Primary Examiner—Gareth D. Shaw
Assistant Examiner—Jan E. Rhoads
Attorney, Agent, or Firm—Fraser and Bogucki

[57] ABSTRACT

In a printer in which character code bytes representing characters to be printed are translated into graphic code bytes, assembled into lines and pages, and thereafter used to select character image bits which are applied to modulate a scanning laser beam and thereby effect printing of the characters, the pitch of each character is determined independently of other characters in each line being printed by pitch bits included in the sets of character image bits. As each scan line of modulation bits from a set of character image bits is selected for use in modulating the laser beam, the pitch bit included within the bits is examined to determine whether the width of the charactor is to be a maximum or some value less than the maximum. For the maximum width all of the modulation bits are applied to modulate the laser beam, while for a character cell width less than the maximum, only a selected number of the modulation bits are used to modulate the laser beam. An oscillator maintains a constant clock rate for the system as it defines modulation periods for the individual bits, while associated timing circuitry controls the serial flow of selected modulation bits to modulate the laser beam as well as the successive addressing of the different graphic code bytes in the line being printed.

16 Claims, 7 Drawing Figures

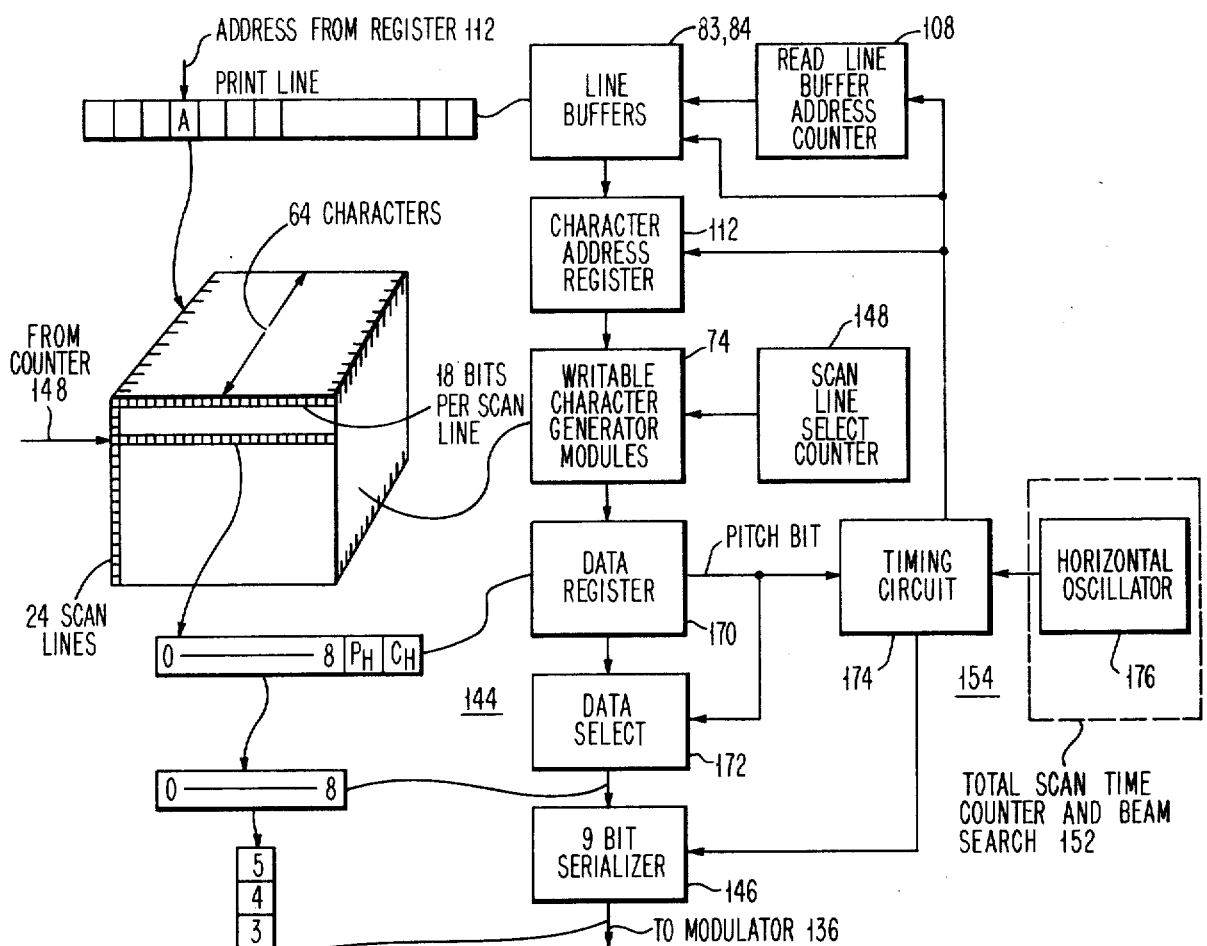
FIG. 5
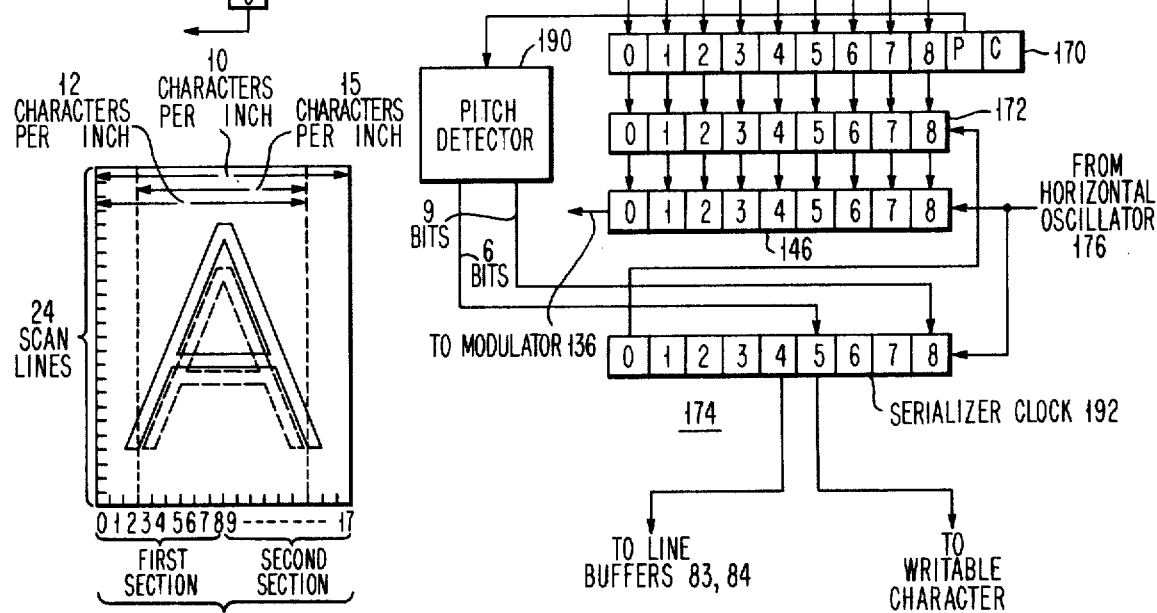
FIG. 6
FIG. 7

INTERMIXED PITCHES IN A BUFFERED PRINTER

BACKGROUND OF THE INVENTION

1. Field of the Invention

The present invention relates to printers of the type which print characters in response to coded digital data, and more particularly to arrangements within such printers for varying the pitch of the printer characters.

2. History of the Prior Art

Printers of the type which print graphic characters in response to coded character data in binary form have found widespread use in many data processing operations and systems. Such printers respond to the incoming coded character data to physically print the graphic characters represented by the character data as defined by the code thereof. The printing operation can assume various different forms including the well-known impact printer in which each segment of the coded character data results in the selection of a piece of type or other raised indicia. The selected piece of type strikes a piece of paper or other printable medium to effect printing of the desired graphic character.

Prior art printers of the type described suffer from a number of disadvantages which often limit their usefulness. One limitation of such printers relates to the difficulty in varying the pitch as defined by the width of the characters being printed. Depending upon system design, character width is typically difficult or impossible to vary. In particular it is impossible to vary the width of characters within a given print line so as to be able to intermix pitches within the given line. Further disadvantages reside both in the nature of the printer itself and in the particular techniques which must be employed to vary the pitch. For example, it would be desirable to be able to separately identify the desired pitch for each character in a print line and thereafter vary the width of each character as it is printed independently of the width of other characters in the line.

BRIEF DESCRIPTION OF THE INVENTION

The present invention provides for intermixed pitches within a print line be examining a pitch bit associated with each one of a plurality of scans for each one of the plural characters in a line being printed. The pitch bit denotes the number of modulation bits within the particular scan of the character which are to be used to modulate the laser beam during the scan. Where each of the pitch bits of a given character being printed indicates maximum character width, all of the modulation bits in each of the scan lines are used to print the character. Where the pitch bits indicate a reduced character width, a selected portion but not all of of the available modulation bits in each scan line of the character is used to modulate the laser beam during scanning, thereby printing the character with a reduced width.

In one preferred arrangement of a printer in accordance with the invention graphic code bytes representing characters to be printed are assembled into plural lines of one or more pages with the plural lines being successively advanced to a line buffer. The graphic code bytes in the line buffer are sequentially addressed in synchronism with scanning of the laser beam by timing circuitry associated with a horizontal oscillator defining a fixed clock for the system. As each graphic code byte is addressed a corresponding set of character image bits is selected from a writable character generator module and the modulator and pitch bits comprising an appropriate scan line of the set corresponding to the particular scan of the laser beam being undergone are advanced to a data register. The number of modulator bits varies according to the width of the character to be printed. Timing circuitry responds to the pitch bit to determine when the end of the scan for the particular character will occur so that addressing of the next graphic code byte of the line in the line buffer can be signaled. The timing circuitry controls the gating of the modulator bits through a data select circuit to a serializer where the bits are sequentially applied to modulate the laser beam.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 5 is a block diagram of a particular arrangement used in the arrangement of FIG. 4 to provide for intermixing of pitches in accordance with the invention;

FIG. 6 is a graphical illustration of a character cell showing the manner in which the pitch of the character is varied; and FIG. 7 is a detailed block diagram of portions of the arrangement of FIG. 5.

DETAILED DESCRIPTION

Figure 1:
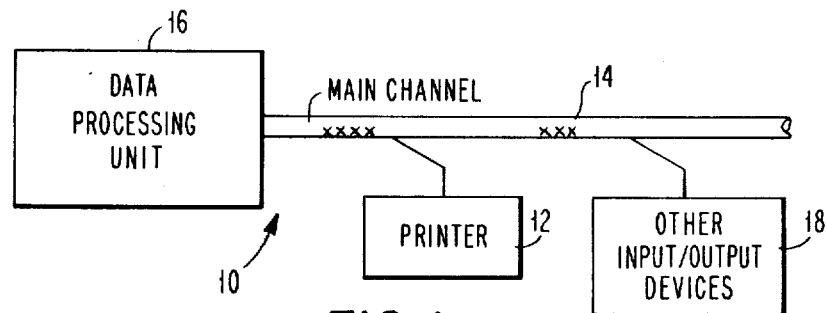
FIG. 1 is a basic block diagram showing the manner in which printers according to the invention are coupled to a data processing unit via a main channel.

FIG. 1 illustrates a data processing system 10 which includes a printer 12 in accordance with the invention coupled to a main channel 14 of a data processing unit or computer 16. The printer 12 comprises an input/output device, and the main channel 14 may be and is typically coupled to other input/output devices illustrated as 18 in FIG. 1.

The general operation of the data processing system 10 in conjunction with the printer 12 is described in detail in a co-pending application, Ser. No. 522,998, Gerald I. Findley, PRINTER. As described in that application the data processing unit 16 which typically includes a central processing unit and a main store communicates with the printer 12 and the other input/output devices 18 via the main channel 14. Character code bytes, each of which represents a different character to be printed by the printer 12, are originated in the data processing unit 16 and are communicated to the printer 12 as part of a channel command word sent to the main channel 14. Other channel command words originating in the data processing unit 16 include certain operating constants used in the printer 12 and certain instructions for the operation of the printer 12.

Figure 2:
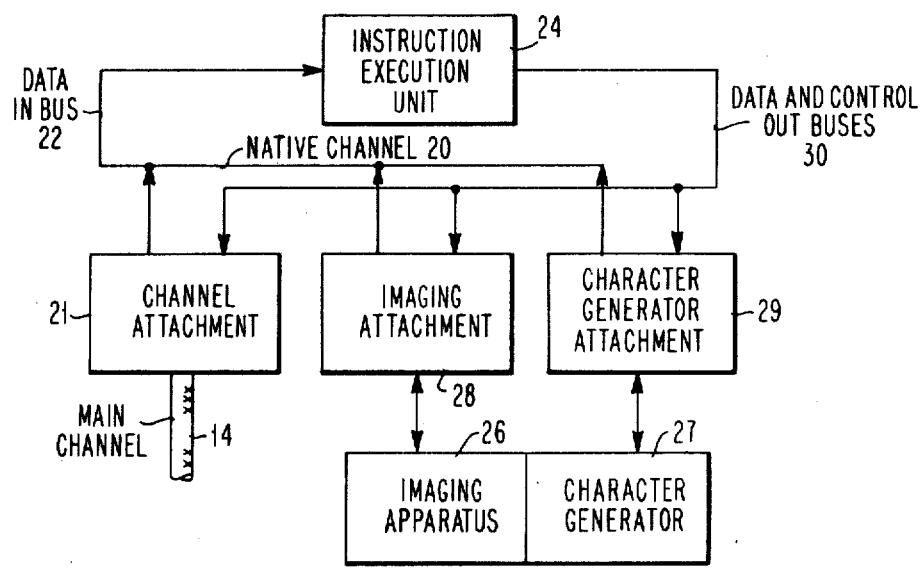
FIG. 2 is a block diagram of the basic components comprising the printer shown in FIG. 1.

FIG. 2 shows the basic arrangement of the printer 12 of FIG. 1 according to the invention. The printer 12 includes a native channel 20 coupled to the main channel 14 via a channel attachment 21 and providing appropriate interface between the main channel 14 and the printer 12. Data from the data processing unit 16 is communicated over the main channel 14 to the channel attachment 21 where it is carried by a data in bus 22 within the native channel 20 to an instruction execution unit (IEU) 24. The data in bus 22 also provides data to the instruction execution unit 24 from imaging apparatus 26 and a character generator 27. The imaging apparatus 26 is coupled to the native channel 20 via an imaging attachment 28, and the character generator 27 is coupled to the native channel 20 via a character generator attachment 29. Data at the output of the instruction execution unit 24 is carried by data and control out buses 30 to the character generator 27, the imaging apparatus 26 and the native channel 20.

The instruction execution unit 24 stores the data from the data processing unit 16 and executes the instructions provided by the various microroutines of microprograms loaded by the printer's user from a flexible disk storage. The microprograms define eight prioritized levels, during the last of which various commands from the main channel 14 are executed. Execution of the various microroutines initiates operation of the imaging apparatus 26, processes the data to be printed into an appropriate form for communication to the character generator 27, operates the character generator 27 to provide sets of character image bits corresponding to characters to be printed to the imaging apparatus 26, and operates the imaging apparatus 26 to effect printing of the desired characters.

The operation of the various components of the printer 12 shown in FIG. 2 is described in detail in the previously referred to co-pending application, Ser. No. 522,998.

Figure 3:
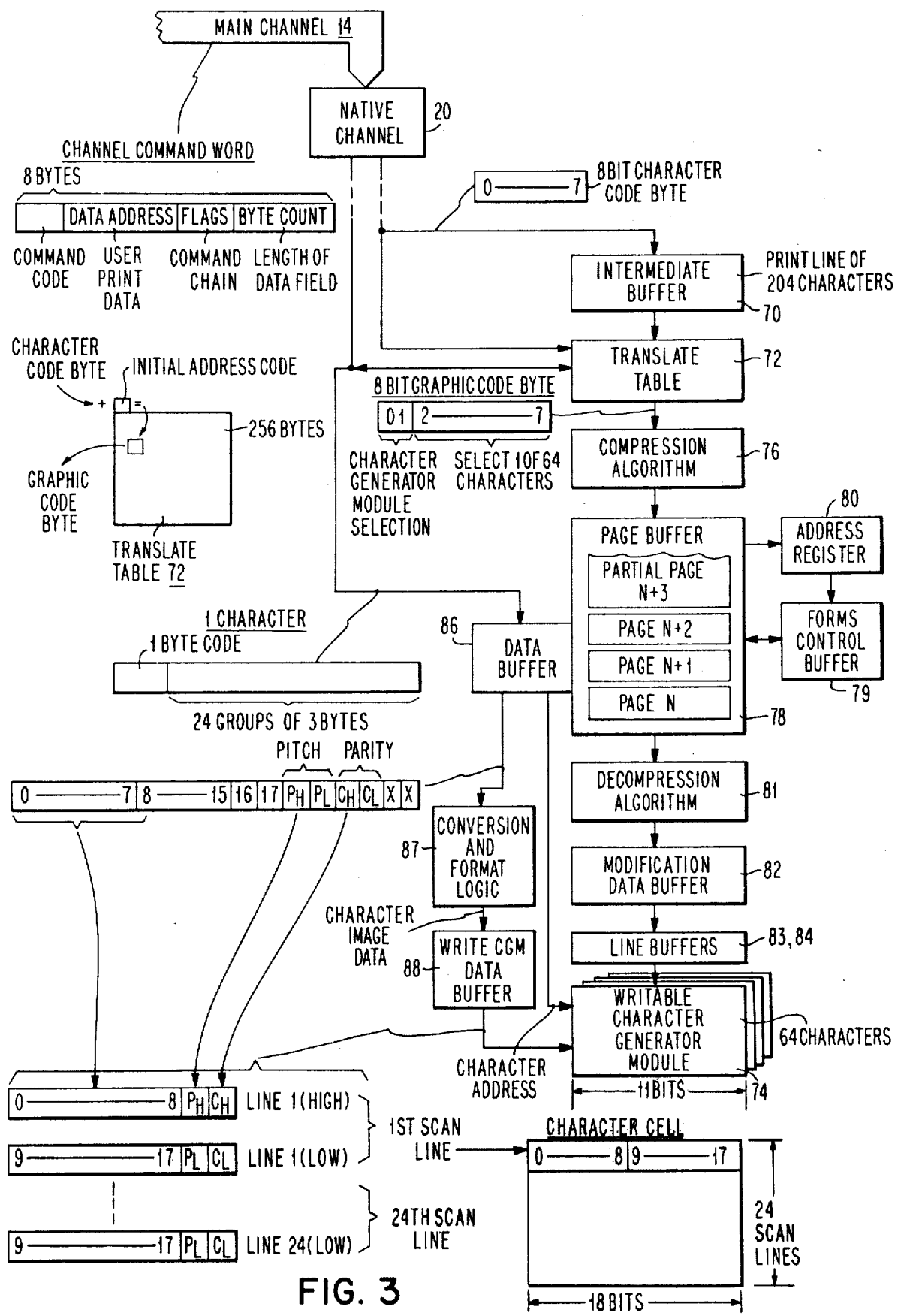
FIG. 3 is a block diagram illustrating a portion of the printer in FIG. 1 in detail.

Selected portions of the instruction execution unit 24 and the character generator 27 are illustrated in FIG. 3. The instruction execution unit 24 includes a writable control storage area providing for most of the various components shown in FIG. 3. The various components are set up within the writable control storage area using data and instructions communicated over the main channel 14 from the data processing unit 16.

Data representing characters to be printed is communicated by the data processing unit 16 and initially stored in the instruction execution unit 24 in the form of a succession of 8 bit character code bytes, with each byte representing a character to be printed. As illustrated in FIG. 3 the 8 bit character code bytes which comprise the user print data portion of channel command words originated in the data processing unit 16 and communicated into the main channel 14 are directed via the native channel 20 to an intermediate buffer 70. The channel command word also includes a command code which the printer 12 is to execute, flags which control execution of the channel command word by the main channel 14 and a length of data field which indicates the number of characters in the print line which is comprised of the various 8 bit character code bytes in the user print data and which is communicated to the intermediate buffer 70.

Up to 204 of the character code bytes are assembled in the intermediate buffer 70 to form a pring line. 204 characters represents the maximum width of a print line for paper of given width in the imaging apparatus 26. The 8 bit character codes employ a hexidecimal representation to compact the data and are encoded using the well-known EBCDIC code. The EBCDIC coding of the bytes defines the characters which the various bytes represent. The various character code bytes stored in the intermediate buffer 70 are applied to a translate table 72 where they are translated, one-by-one, into corresponding graphic code bytes using the predetermined code or algorithm of the translate table 72. The predetermined code or algorithm of the translate table 72 is implemented by adding each character code byte to an initial address for the table 72 and using the resulting sum as an address for the corresponding graphic code byte stored within one of the various storage locations in the translate table 72. The translate table 72 is capable of storing up to 256 graphic code bytes, and has a position for all possible character codes that can come from the data processing unit 16. An example of the manner in which the translate table 72 may be set up is provided at page 57 of IBM System/360 Principles of Operation, Form A22-6821-6, Jan. 13, 1967, published by International Business Machines Corporation. Each of the graphic code bytes comprises the address of a set of character image bits stored within one of four different writable character generator modules 74 in the character generator 27. As shown in FIG. 3 each 8 bit graphic code byte from the translate table 72 comprises a first two bit field identifying a particular one of the four different writable character generator modules 74 and a second six bit field identifying 1 of 64 different storage locations within the selected writable character generator module. The selection of a storage location within one of the writable character generator modules 74 by a graphic code byte results in a set of character image bits stored in the particular location being used by the imaging apparatus 26 to print a character.

The graphic code bytes from the translate table 72 are next compressed in length using a compression algorithm 76 as they are entered into a page buffer 78 for storage therein. As previously mentioned each line may comprise as many as 204 characters. Since a page can have as many as 80 lines thereon for 11 inch paper, a page can comprise as many as 16,320 bytes. Since the purpose of the page buffer 78 is to assemble the translated data into one or more pages, the page buffer 78 would have to have a minimum capacity of 16,320 bytes per page in the absence of compression. By using the compression algorithm 76 however the graphic code bytes for an average page are sufficiently reduced in number so tht an equivalent of only about 2000 bytes is required in the way of storage space for each page in the page buffer 78.

In the present example compression is performed whenever a succession of identical characters occurs which has more than a predetermined number of the characters in it. The resulting information storedin the page buffer 78 consists of a first byte which identifies the presence of a compression, a second byte which indicates the number of characters being compressed, and a third byte which is the character being compressed. An example of a compression technique which may be used is provided in IBM Technical Disclosure Bulletin Vol. 16, No. 8, Jan. 1974, DATA COMPRESSION TECHNIQUE FOR THE ELIMINATION OF REPEATING BYTE STRINGS, M. Ojalvo.

The page buffer 78 continues to assemble the compressed graphic code bytes into pages until filled. While the page buffer 78 is only required to store at least one complete page, it is typically provided with enough storage capacity to store several pages as shown in FIG. 3.

The channel command words from the data processing unit 16 include certain modifier bits which control the vertical format of each page in terms of the space between lines and the height of the characters in each line. These functions are provided by a forms control buffer 79 in conjunction with an associated address register 80. The operation of the forms control buffer 79 and the address register 80 is described in a copending application, Ser. No. 522,998, Gerald I. Findley and Teddy L. Anderson, INTERMIXED LINE HEIGHTS AND BLANK LINE FORMATION IN A BUFFERED PRINTER. As described in that application a different forms control byte is stored in the forms control buffer 79 for each line entered in the page buffer 78. The address register 80 identifies the various forms control bytes. One bit of each forms control byte defines the height of a corresponding line and is applied in the character generator 27 to select the number of scan lines used when the line is printed. Other bits in each forms control byte define a channel number. A channel command word defines blank lines to be inserted in a page by specifying the lines to be spaced or the channel number to be skipped to. Each time the address register 80 is incremented in spacing or skipping to the sought channel number within the forms control buffer 79 a special code is entered in the page buffer 78. When the page is being printed by the character generator 27, each of the special codes causes the character generator 27 to inhibit any modulator output so that a blank line results in the printed page.

The compressed graphic code bytes assembled into pages in the page buffer 78 are decompressed upon leaving the page buffer 78 by a decompression algorithm 81 which is the reverse of the compression algorithm 76 prior to being passed together with data from a modification data buffer 82 to one of a pair of line buffers 83, 84 within the character generator 27. The decompression algorithm 81 restores each graphic code byte to the original form that it assumes at the output of the translate table 72. The modification data buffer 82 stores data used in making minor changes between copies when plural copies of the same page are to be printed. This avoids the necessity of assembling a complete page in the page buffer 78 for each page which differs only in minor respects from a previously printed copy.

The imaging apparatus 26 of the present example modulates a laser beam as the beam is scanned in raster fashion over a character space to print each character. Each character space is defined by a character cell having a height defined by 24 scans of the laser beam and a width defined by 18 bits representing the number of times the beam can be modulated during each scan of the character cell. Each set of character image bits stored in one of the writable character generator modules 74 comprises as many as 432 bits defining the 18 horizontal bit spaces for each of the 24 different scans of the laser beam. Accordingly the character image bits define those portions of the grid pattern or matrix comprising the character cell which the particular character to be printed comprises.

In the present example each writable character generator module 74 is only 11 bits wide while the character cell is 18 bits wide. Accordingly it is necessary to break each scan line of 18 bits of the character cell into two sections of data for purposes of storing the sets of character image bits in the writable character generator module 74. Since each character may involve as many as 24 scan lines, 48 sections of data must be stored in the writable character generator module 74 for each set of character image bits. Since each writable character generator module 74 is 11 bits wide, each section of data stored therein is 11 bits long and includes a field of 9 bits, a parity bit and a pitch bit. Each pair of the sections of data stored in the writable character generator module 74 comprises a high section and a low section. As described in connection with the character generator of FIG. 4 a complete line of characters is printed a scan at a time. Accordingly the two sections of bits corresponding to the scan for each character are successively taken from the writable character generator modules 74 and used to modulate the laser beam.

The sets of character image bits stored in the writable character generator modules 74 are program alterable directly from the data processing unit 16. Sets of character image bits can initially be loaded into the writable character generator modules 74 either directly from the data processing unit 16 or from a flexible disk storage described in FIG. 4, and the sets of character image bits can be selectively replaced under control of the data processing unit. Each set of character image bits to be stored or replaced in one of the writable character generator modules 74 is communicated over the main channel 14 from the data processing unit 16 in the form of a 73 byte block as shown in FIG. 3. The first byte of the block defines the storage location within the writable character generator modules 74 where the new set of character image bits is to be stored. The remaining 72 bytes of the block arranged into 24 groups of 3 bytes each define the character image bits. Each group of 3 bytes contains the 18 bits for one of the scan lines of the character cells.

The first byte of the block comprising a character address is routed to a data buffer 86 via the translate table 72 where it is converted by the table address. The remaining 72 bytes of the block are routed directly to the data buffer 86. The data buffer separates the character address from the remaining 72 bytes comprising image data and passes the character address to the writable character generator modules 74. One group of 3 bytes (24 bits) is shown at the output of the data buffer 86 in FIG. 3 and includes the 18 bits comprising the scan of the character cell (0–7, 8–15, 16, 17), a high pitch bit $P_H$, a low pitch bit $P_L$, a high parity bit $C_H$, a low parity bit $C_L$ and two spare bit spaces designated X.

The 3 byte groups from the data buffer 86 are applied to conversion and format logic 87 where they are converted and reformatted into pairs of 11 bit sections for storage in the writable character generator modules 74. The conversion and format logic 87 uses appropriate and-or circuitry for reformatting the 3 byte group into a first section comprising bits 0–8, $P_H$, $C_H$ and a second section comprising bits 9–17, $P_L$, $C_L$. In addition the pitch bit $P_H$ or $P_L$ of each section is examined. If the maximum pitch of 10 characters per inch is indicated the bits are not altered. If the minimum pitch of 15 characters per inch is indicated the bits are shifted 3 positions to eliminate 3 of the bits which are replaced by zeros. As described hereafter in connection with FIGS. 5–7 the remaining 6 bits are used to print a character with truncated cell width. In a case where an intermediate pitch of 12 characters per inch is indicated, the high or first section of the scan is unaltered while the low or second section is reduced from 9 bits to 6 bits.

The converted and reformated sections of bits are loaded into the writable character generator modules 74 via a write character generator module data buffer 88. The 1 byte code character address at the output of the data buffer 86 functions in the manner of the graphic code bytes at the output of the translate table 72 to define a selected one of the four writable character generator modules 74 and the selected ones of the 64 different locations within the selected module in which the new set of character image bits is to be stored.

Figure 4:
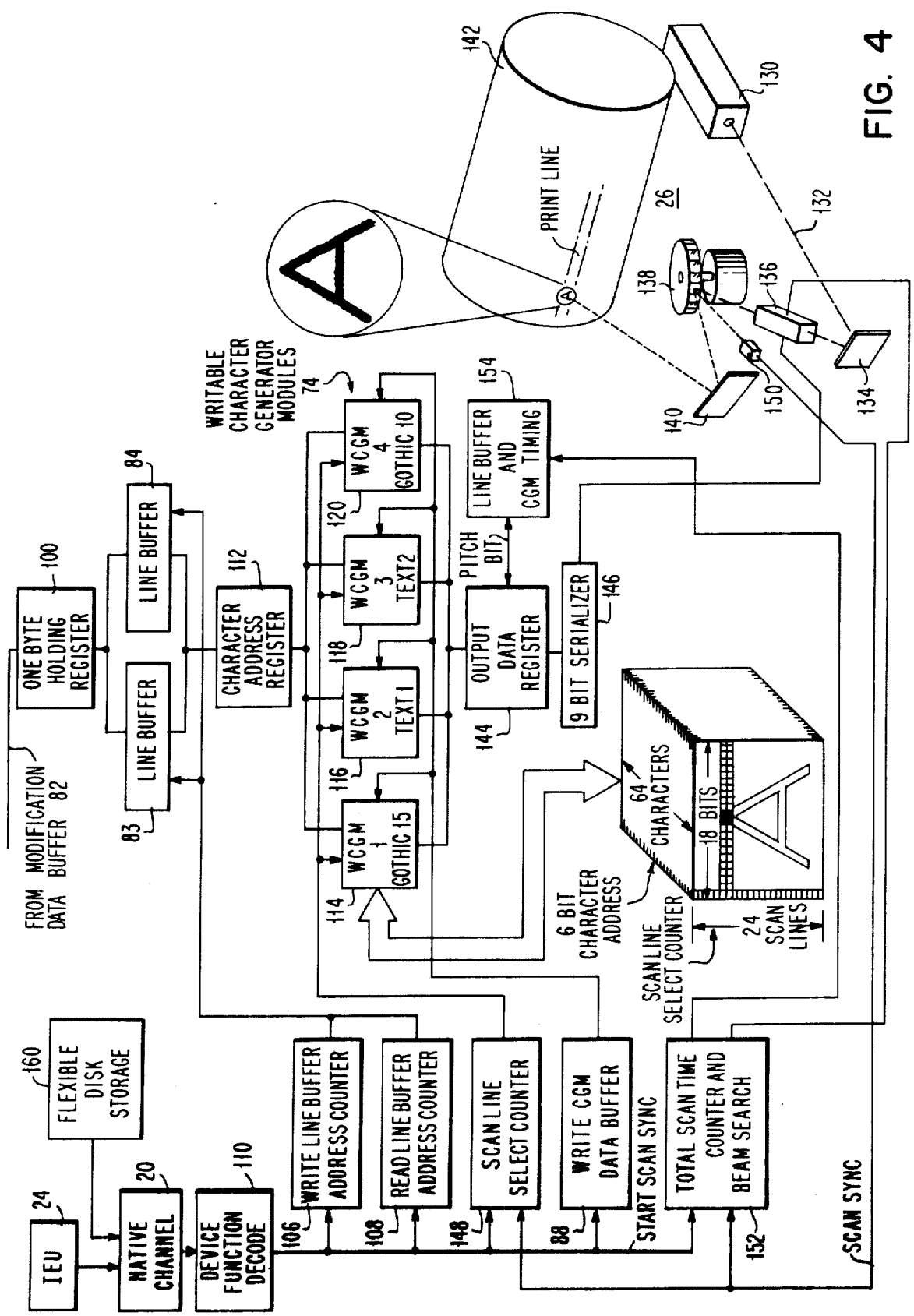
FIG. 4 is a block diagram illustrating another portion of the printer of FIG. 1 in detail.

The character generator 27 is shown in FIG. 4 together with a portion of the imaging apparatus 26. The graphic code bytes from the writable control storage 40 are fed via the native channel 20 to the character generator 27 where they are received by a 1 byte holding register 100 at the inputs of the line buffers 83 and 84. The loading and unloading of the line buffers 83 and 84 is controlled by a write line buffer address counter 106 and a read line buffer address counter 108 coupled to a device function decode 110. The device function decode 110 responds to control data from the instruction execution unit 24 which is intended for the character generator 27 to the exclusion of other data. Examples of circuits which can be used as the device function decode 110 are shown on page 9–163 of the *First Edition of The Integrated Circuits Catalog For Design Engineers*, published by Texas Instruments Incorporated. The control data is fed via the native channel 20 to cause the contents of one of the line buffers 83, 84 to be passed to the writable character generator modules 74 for printing while the other line buffer is being loaded from the 1 byte holding register 100, and vice versa. Accordingly the line buffers 83 and 84 alternately load and print. While the write line buffer address counter 106 controls the loading of one of the line buffers 83, 84 one byte at a time to assemble a print line therein in response to control data from the microprogram, the read line buffer address counter 108 responds to the character generator attachment 29 to control the outputting of the other line buffer through a character address register 112 to the writable character generator modules 74.

In the present example the four different character generator modules 74 comprise modules 114, 116, 118 and 120. The first module 114 is loaded with Gothic 15 pitch characters, the second module 116 is loaded with characters conforming to a text 1, the third module 118 is loaded with characters conforming to a text 2 and the fourth module 120 is loaded with Gothic 10 pitch characters. Each of the modules 14, 116, 118 and 120 is capable of storing up to 64 characters. The contents of the first character generator module 114 are graphically illustrated in FIG. 4 in terms of the 24 scans of 18 bits each comprising each of the 64 characters. Two of the 18 bit scan lines are shown for the top portion of the character A. As previously described the bits within the module 114 modulate a laser beam to produce the desired character.

The imaging apparatus 26 includes a laser 130 for providing a laser beam 132. The laser 130 may comprise a low power Helium neon laser, as shown, for example, in U.S. Pat. No. 3,750,189. The laser 132 is reflected by a mirror 134 through a modulator 136 and onto a rotating mirror 138. The modulator 136 may comprise an acousto-optic modulator of the type shown in U.S. Pat. Nos. 3,419,322 and 3,586,120. The rotating mirror 138, which may comprise a series of reflective facets on a metal block as shown, for example, in U.S. Pat. No. 3,750,189, has a plurality of small mirrors spaced about the periphery thereof so as to reflect the laser beam from the modulator 136 into a mirror 140. The mirror 140 reflects the modulated beam onto a rotating print drum 142. The rotating mirror 138 rotates at a selected speed to provide a rapid succession of scans of the modulated laser beam across the print drum 142.

The modulator 136 causes the laser beam 132 to be modulated by bits from the character generator modules 74 applied via an output data register 144 and a 9 bit serializer 146. Timing of the character generating modules 74 is controlled by a scan line select counter 148 which is initialized to the first scan line at the start of each print line. The scan line select counter 148 operates in response to a scan signal from a scan start detector 150 to synchronize the outputting of bits from the character generator modules 74 with the rotation of the mirror 138. The scan start detector 150, which comprises a sensing device responsive to light of laser wavelength such as a photocell, a phototransistor or a photodiode of the type shown, for example, in U.S. Pat. No. 3,750,189, generates a signal in response to each facet of the rotating mirror 138 and therefore signals the beginning of each scan. A total scan time counter and beam search 152 responds to a start scan signal from the device function decode 110 to initiate operation of the modulator 136. As each scan is begun the scan start detector 150 signals the scan line select counter 148 to pick a particular scan of a graphic character in one of the writable character generator modules 74 and to begin feeding bits from one of the character generator modules 74 to the output data register 144. The read line buffer address counter 108 keeps a count of the various character positions in the line buffers 83, 84. At the beginning of each scan as determined by the scan line select counter 148, the character address register 112 causes selection of the appropriate bits from the writable character generator modules 74 under the control of the read line buffer address counter 108. The total scan time counter and beam search 152 responds to the scan sync signal at the start of each scan to turn on the modulator 136 and the laser 130 for the next scan start.

As described in detail hereafter the pitch bits $P_H$ and $P_L$ determine the pitch or width of the character. At the beginning of each scan the first line of data bits corresponding to the first scan of the first character is advanced to the output data register 144 where the pitch bit $P_H$ or $P_L$ thereof is sensed by line buffer and CGM timing 154. The line buffer and CGM timing 154 responds to a horizontal oscillator within the total scan time counter and beam search 152 by passing to the 9 bit serializer 146 only those bits of each scan which are to be used to modulate the laser beam. While all 18 bits of each scan are used for a pitch of 10 characters per inch, only 12 bits of each scan are used for a pitch of 15 characters per inch so as to truncate the character cell widths.

The pitch of the character having been determined, the section representing the first half of the first scan of the first character temporily stored in the output data register 144 is advanced to the 9 bit serializer 146 where each of the bits thereof is serially fed to the modulator 136 to modulate the laser beam 132 as it scans across the first half of the first character. At that point the second section of data is advanced throgh the output data register 144 to the 9 bit serializer 146, and the resulting serial stream of bits is used to modulate the laser beam during the second half of the first scan of the first character. At this point the laser beam is about to begin the first scan of the second character on the line. The first and then the second sections of bits representing the first scan of the second character are successively advanced through the output data register 144 and the 9 bit serializer 146 to modulate the laser beam. The system continues in this fashion until the laser beam has completed the first scan of each of the characters in the line, at which point the scan line select counter 148 is incremented and the next scan of the laser beam begins and is sensed by the scan start detector 150. The third and then the fourth sections of data bits for the first character are provided to the output data register 144 and the 9 bit serializer 146 to print the second scan of the first character. The third and fourth sections of bits for each succeeding character are used to modulate the laser beam until the second scan of the entire print line is completed. The system continues in this fashion until the laser beam has made 24 scans of the print line and all characters on the line have been printed. Thereafter the process is repeated for each succeeding print line.

As previously mentioned the sets of character image bits in the character generator modules 74 can be loaded or replaced directly via the data buffer 84, the conversion and format logic 86 and the write CGM data buffer 88. Alternatively the sets of character image bits can be loaded directly from a flexible disk storage 160 via the write CGM data buffer 88.

As described in detail in the previously mentioned copending application, Ser. No. 522,998, the imaging apparatus 26 employs known electrophotographic techniques to develop the discharge areas on the surface of the drum 142 which result from the modulated laser beam 132. The drum 142 is rotated past a developer where the surface is coated with a toner which adheres to the discharge areas of the surface. The toner is transferred onto a paper which comes into contact with the drum surface, and the paper as so printed with the toner is advanced through a fuser to a continuous forms stacker.

The arrangement for determining the pitch of the printed characters is shown in greater detail in FIG. 5. The output data register 144 coupled between the writable character generator module 74 and the 9 bit serializer 146 in the FIG. 4 arrangement is shown in FIG. 5 as including a data register 170 coupled to the output of the writable character generator modules 74 and a data select circuit 172 coupled between the output of the data register 170 and the input of the 9 bit serializer 146. The line buffer and CGM timing 154 shown in FIG. 4 includes a timing circuit 174 and a horizontal oscillator 176 which comprises a part of the total scan time counter and beam search 152. The timing circuit 174 responds to pitch bits from the data register 170 and to clock signals provided by the horizontal oscillator 176 to provide signals to the read line buffer address counter 108, the line buffers 83, 84, the character address register 112, the data select circuit 172 and the 9 bit serializer 146.

At the start of each scan of the laser beam 132 the scan sync signal from the scan start detector 150 shown in FIG. 4 is applied to the scan line select counter 148 to update the scan line select counter which provides information with respect to each scan being undergone by the laser beam. The read line buffer address counter 108 keeps a count of the character positions in the line buffers 83, 84. At the start of the scan the character address register 112 examines the first character in that one of the line buffers 83, 84 to be used for printing. The character address register 112 responds to the first character by selecting the corresponding set of character image bits in the writable generator modules 74. The scan line select counter 148 selects the appropriate scan line from within the selected set of character image bits, causing the appropriate one of the two different sections comprising the scan line as shown in FIG. 3 to be entered in the data register 170. Each section comprises up to 9 modulation bits, a pitch bit $P_H$ or $P_L$ and a parity bit $C_H$ or $C_L$. The data register 170 separates the pitch bit and applies it to the timing circuit 174 where it is used to control the outputting of the modulation bits from the 9 bit serializer 146 and the advancing of the next section of bits from the writable character generator modules 74 into the data register 170 as described hereafter in connection with FIG. 7. The data select circuit 172 responds to the timing circuit 174 by gating the section of bits stored in the data register 170 into the 9 bit serializer from which the bits are serially applied to modulate the laser beam.

If the pitch bit is of one binary value denoting the maximum character width corresponding to 10 characters per inch, the section of bits stored in the writable character generator modules 74 is comprised of 9 modulation bits, all of which are temporarily stored in the data register 170, gated through the data select 172 and serially outputted by the 9 bit serializer 146 to modulate the laser beam. As previously noted the conversion and format logic 87 shown in FIG. 3 responds to a pitch bit of opposite binary value to shift the 9 bits of the high or first section by 3 positions and add 3 zeros. The resulting section comprising 6 modulation bits and 3 zeros is then stored in the writable character generator modules 74. During printing the section is gated from the data register 170 into the 9 bit serializer. The timing circuit 174 responds to the pitch bit to serially gate the 6 modulation bits to the laser modulator 136, following which the next bit section is immediately advanced and used for printing. Where the minimum pitch of 15 characters per inch exists, both sections of bits as stored in the writable character generator modules 74 are comprised of 6 modulation bits each. Where an intermediate pitch of 12 characters per inch is desired, the left or high section is comprised of the full 9 modulation bits while the right or low section is comprised of 6 modulation bits.

The horizontal oscillator 176 which may comprise a crystal oscillator having an output gated through a frequency divider under control of the beam search 152 provides a constant clock rate for the system with each oscillation defining the time period for one of the modulation bits to modulate the laser beam. Since the pitch bit designates the number of modulation bits to be used to modulate the laser beam, the timing circuit 174 responds to the pitch bit by making a record of the number of clock pulses from the oscillator 176 required to accomplish modulation using the selected bits. The timing circuit 174 which may comprise nine different latches coupled to operate as a shift register shifts this value in response to each clock pulse from the oscillator 176 representing that another bit has been used to modulate the laser beam. When the number of clock pulses from the oscillator 176 equals the number of modulation bits used to modulate the laser beam; the timing circuit 174 provides a signal to the data select 172 to gate the next section of bits stored in the data register 170 to the serializer 146. The process is then repeated with the new pitch bit $P_L$ providing a determination of the number of bits to be used for modulation and instructing the timing circuit 174 as to the number of clock pulses that will be required to modulate the laser beam using the modulation bits before printing of the next section of modulation bits is begun. When all of these bits have been used to modulate the laser beam, the timing circuit 174 in conjunction with the read line buffer address counter 108 causes first one and then the other of the two scan sections of the next character in the line to be used for printing.

The system continues in the fashion described for each character in one of the line buffers 83, 84 until the scan is completed. Thereafter the system gets ready to print the next scan of the line of characters by updating the scan line select counter 148. The system then prints the new scan line in similar fashion. The character address register 112 responds to each character in the print line by selecting the appropriate set of character image bits in the writable character generator modules 74, while the scan line select counter 148 identifies the proper scan line within the character image bits. The resulting bits are applied to the data register 170 for gating via the data select 172 to the 9 bit serializer 146 under control of the timing circuit 174.

FIG. 5 graphically illustrates the operation of the circuitry thereof. The graphic illustration includes depiction of a print line in one of the line buffers 83, 84 which is comprised of a succession of characters including a character A. When the character A is addressed by the character address register 112, a corresponding one of the 64 different sets of character image bits in the writable character generator module 74 is selected. At the same time the scan line select counter 148 selects the appropriate scan line from the selected group of character image bits. The first section of this scan line comprising bits 0–8, pitch bit $P_H$ and parity bit $C_H$ is advanced to the data register 170 as shown in FIG. 5. In the present example the pitch bit $P_H$ is assumed to indicate a reduced character width, so that only bits 3–8 are modulation bits with bits 0–2 being zeros. While all 9 bits (0–8) are gated to the 9 bit serializer 146, the timing circuit 174 responds to the pitch bit $P_H$ by allowing only 6 bits to serially advance to the laser modulator 136 before looking to the next section of bits. Modulation bits −8 of the section are stored in bit positions 0–5 of the writable character generator modules 74. Therefore the first 6 bits out of the serializer 146 are the modulation bits 3 −8.

FIG. 6 graphically illustrates the manner in which the width of the character cell is truncated to provide different pitches for the characters in accordance with the invention. When the pitch bit indicates that the character is to have the maximum pitch correspoding to 10 characters per inch, both sections of each scan of the character are provided with 9 modulation bits and the resulting character has a maximum width (18 bits) so as to occupy substantially the entire character cell as shown by the A in solid outline in FIG. 6. Where the minimum pitch corresponding to 15 characters per inch is indicated, the first section of 9 modulation bits is shifted by 8 bit positions in the conversion and format logic 87 of FIG. 3 so as to provide each section with only 6 modulation bits as it is stored in the writable character generator modules 74. The second section of 9 bits is stored directly into the writable character generator modules 74. Consequently when the character is printed the width of the cell (12 bits) is truncated and the resulting character is as shown by the dotted A in FIG. 6. In the case of an intermediate pitch corresponding to 12 characters per inch, the left or high section of each scan is provided with the full 9 modulation bits while the right or low section of each scan is reduced to 6 modulation bits. The result which is not shown in FIG. 6 is to center the character in the truncated cell width of 15 bits. The 3 modulation bits on the right side are not used.

A portion of the arrangement of FIG. 5 is shown in detail in FIG. 7. As seen in FIG. 7 the data register 170 comprises an 11 bit register for accommodating 9 modulation bits, the pitch bit and the parity bit. The register position for receiving the pitch bit $P_H$ or $P_L$ is coupled to a pitch detector 190 which may comprise a pair of AND gates and an OR gate. If the pitch bit is of one binary value indicating that 9 modulation bits are to be used, one of the AND gates of the the pitch detector 190 provides an output to the 8 or last bit position of a 9 bit serializer clock 192 comprising a part of the nine bit shift register of the timing circuit 174. If the pitch bit is of the other binary value indicating that 6 modulation bits are to be used, the other one of the AND gates of the the pitch detector 190 provides a signal to the 6th or 5 bit position of the serializer clock 192 via the OR gate of the pitch detector 190.

At the same time as the pitch bit is being detected by the detector 190 to provide a signal to the serializer clock 192, the 9 bits comprising bits 0–8 stored in the register comprising the data register 170 are gated through a 9 bit register comprising the data select 172 to a 9 bit register comprising the 9 bit serializer 146 under the control of a signal from the first or 0 bit position of the serializer clock 192. Thereafter the 9 bit serializer 146 which comprises a shift register responds to each clock pulse from the horizontal oscillator 176 to advance a different one of the bits stored therein to the modulator 136. The serializer clock 192 also responds to the clock pulses from the horizontal oscillator 176 by sequencing through the different bit positions thereof in synchronism with the outputting of bits from the 9 bit serializer 146. When the serializer clock 192 reaches the 5 bit position thereof a signal is provided to the writable character generator modules 74 to begin access to the next scan section for that of the following character. When the serializer clock 192 advances to the 4 bit position thereof, a signal is provided to the line buffers 83, 84 if a new character is to be accessed. This signal results in the next scan section being located within the writable character generator modules 74. When the serializer clock 192 reaches the 0 bit position, a signal is provided to the data gate 172 to gate the bits stored in the data register 170 into the 9 bit serializer 146. Thus the initial placement of the pitch bit into the serializer clock 192 (position 8 or 5) and the subsequent movement toward position 0, wherein new data is gated to the serializer, determines whether 9 bits or 6 bits are to be modulated by the laser beam before providing the gating signal to the data select 172.

The arrangement shown in FIG. 7 continues to function in the same manner for each scan section. While one scan section is being used for printing, the serializer clock 192 provides a signal at the 4 bit position to identify the next scan section in the writable character generator modules 74 to be used. When the 5 bit position is reached the serializer clock 192 provides a signal to load the next scan section in the data register 170. If the scan section being printed is comprised of 6 modulation bits, the pitch bit is gated into the serializer clock 192 at bit position 5 and therefore need only advance 6 positions to bit position 0 to gate the next scan section through the data select 172 into the 9 bit serializer 146. Where the scan section being printed is 9 modulation bits in length, the pitch bit must advance 9 bit positions to reach bit position 0.

It will be seen that in arrangements according to the invention the pitch of each character being printed is determined independently of the other characters. It is therefore possible to intermix pitches of the different characters within a given line. Each time the system finishes printing the scan line of one character, it immediately goes on to the next character and begins printing the same scan line for that character. The total number of clock pulses is reduced for a character of reduced width so that the width of the character cell is truncated. Character width is varied by varying the number of modulation bits while using a constant clock rate.

One technique made possible by arrangements according to the invention is that of proportional printing by intermixing characters of different pitches in each line. Characters such as the letter *i* which are relatively narrow are loaded in the writable character generator modules 74 as 15 pitch characters. Wide characters such as the letter *m* are loaded into the writable character generator modules 74 as 10 pitch characters. Intermediate width characters such as the letter *F* are loaded into the writable character generator modules 74 as a 12 pitch character. Since the pitch of each character is separately determined and may vary independently of the other characters in a line, the result is a text in which the various characters of each word have like distances therebetween.

While the invention has been particularly shown and described with reference to a preferred embodiment thereof, it will be understood by those skilled in the art that various changes in form and details may be made therein without departing from the spirit and scope of the invention.

What is claimed is:

1. An arrangement for printing characters of variable pitch, each of the characters being represented by a different segment of character data, comprising:
   storage means;
   means responsive to the character data for assembling the segments of character data in the storage means as a line to be printed;
   means for storing a separate representation of desired character pitch for each of a plurality of the characters, the separate representation determining that one of a plurality of different possible pitches for the character at which the character is to be printed;
   means responsive to the segments of character data arranged into a line for printing the characters represented by the segments of character data; and
   means associated with the means for printing and responsive to the separate representations of character pitch for providing each character in the line with the desired pitch independent of the pitches of other characters in the line as the character is printed.

2. The invention defined in claim 1, wherein the means for printing prints each character in response to a segment of character data using a graphic pattern for the character, and the means for providing each character with the desired pitch includes means responsive to each representation of character pitch for selecting the portion of the total width of the graphic pattern for the character to be used by the means for printing.

3. The invention defined in claim 2, wherein the means for printing prints at a constant rate for a given width of the graphic pattern.

4. An arrangement for printing characters, each of which is represented by a different segment of coded data, comprising:
   means for storing a plurality of groups of graphic data, each group of graphic data defining a particular character and including an indication of which of a plurality of different possible pitches the character is to have;
   means responsive to each segment of coded data for selecting a group of graphic data which defines the character represented by the segment of coded data;
   means responsive to each selection of a group of graphic data by the means for selecting for printing the character defined by the group of graphic data; and
   means responsive to the indication of pitch for each group of graphic data selected by the means for selecting for providing the character defined by the group of graphic data with a desired one of a plurality of different possible pitches independent of the pitch of other characters being printed as the character is being printed.

5. The invention defined in claim 4, further including means responsive to external signals for storing groups of graphic data included in the external signals in the means for storing.

6. The invention defined in claim 5, wherein the means for storing groups of graphic data included in the external signals includes means responsive to the indication of pitch for each group of graphic data for rearranging the groups of graphic data prior to storage.

7. An arrangement for printing characters of variable pitch, each of the characters being represented by a different segment of character data, comprising:
   means for providing an energy beam;
   means for repetitively sweeping the energy beam across an energy sensitive medium in successive scans, each scan being displaced from the immediately preceding scan along the length of the medium;
   means for storing different groups of modulation information, each group defining a particular character in terms of modulation of each of a plurality of scans of the energy beam across the energy sensitive medium and including a representation of desired pitch of the particular character;
   means responsive to a plurality of the different segments of character data representing a line of characters to be printed for modulating the energy beam during successive scans of the energy sensitive medium in accordance with the groups of stored modulation information defining the characters in the line; and means responsive to the representations of desired pitch in the groups of stored modulation information defining the characters in the line for controlling the application of selected portions of the stored modulation information to modulate the energy beam during the successive scans of the energy sensitive medium to thereby print characters having desired pitches.

8. The invention defined in claim 7, wherein the means for modulating modulates the energy beam at a constant rate for a given quantity of modulation information.

9. The invention defined in claim 7, wherein each group of modulation information is divided into a plurality of scan lines with each scan line containing modulation information for a different scan of the energy beam and a separate representation of desired pitch of the character.

10. The invention defined in claim 7 above, wherein each group of modulation information comprises a different group of bits defining the modulation for each of the plurality of scans, each of the different groups of bits including at least one bit indicating desired pitch, and the means for controlling the application of selected portions of the stored modulation information to modulate the energy beam comprises means responsive to each bit indicating desired pitch for determining the number of bits to be used to modulate the energy beam.

11. The invention defined in claim 10 above, wherein each group of bits defining the modulation for each of the plurality of scans comprises a selected number of bits determining the pitch of a character to be printed therefrom.

12. A printer for printing characters, each of which is represented by a different segment of coded digital data, comprising the combination of:
 storage means;
 means responsive to the coded digital data for assembling the data in the storage means as a succession of lines to be printed;
 line buffer means for temporarily storing each successive line of coded digital data to commence printing of the line;
 character generator module means storing a plurality of sets of character image bits, each set of character image bits being arranged into a plurality of scan lines having at least one pitch bit;
 means for sweeping an energy beam across an energy sensitive medium in successive scans;
 means responsive to each scan of the energy beam for sequentially addressing the different segments of coded digital data comprising the line temporarily stored in the line buffer means during the scan; and
 means responsive to each addressing of a segment of coded digital data in the line buffer means for selecting a particular set of character image bits in accordance with the coded digital data and applying the modulation bits of a scan line within the selected set of character image bits corresponding to the scan of the energy beam to modulate the energy beam, said means for selecting including means responsive to the at least one pitch bit of the scan line corresponding to the scan of the energy beam for controlling the application of the modulation bits in the scan line to modulate the energy beam.

13. The invention defined in claim 12, wherein each scan line comprises first and second groups of modulation bits and first and second pitch bits associated with the first and second groups of modulation bits respectively.

14. The invention defined in claim 12, wherein each group of modulation bits of each scan line has a different pitch bit associated therewith and comprises either of two different numbers of modulation bits corresponding to the value of the pitch bit.

15. The invention defined in claim 12, further including means for repetitively generating clock signals, each of which defines a time period for modulation of the energy beam by one modulation bit, and wherein the means for controlling the application of the modulation bits is operative to apply a different one of the modulation bits to modulate the energy beam in response to each clock signal.

16. The invention defined in claim 15, wherein the means for sequentially addressing includes means responsive to the clock signals and to the at least one pitch bit of the scan line corresponding to the scan of the energy beam for providing an indication each time the number of clock signals generated during the portion of a scan comprised by a given character equals the number of modulation bits used to modulate the energy beam.

* * * * *